(12) United States Patent
Hong et al.

(10) Patent No.: US 8,535,392 B2
(45) Date of Patent: Sep. 17, 2013

(54) SOLID POLYMERIC COLORANT COMPOSITIONS

(75) Inventors: Xiaoyong M Hong, Greer, SC (US); Dominick J Valenti, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 386 days.

(21) Appl. No.: 12/277,595

(22) Filed: Nov. 25, 2008

(65) Prior Publication Data

US 2010/0125957 A1    May 27, 2010

(51) Int. Cl.
*C09B 67/02* (2006.01)
*C09B 69/10* (2006.01)

(52) U.S. Cl.
USPC ............ 8/524; 8/647; 510/419; 510/441; 524/445

(58) Field of Classification Search
USPC ............... 510/499, 510, 512, 508, 441, 419; 8/524, 647; 106/289; 426/250, 539, 540; 524/445
See application file for complete search history.

(56) References Cited

U.S. PATENT DOCUMENTS

| | | | |
|---|---|---|---|
| 3,945,980 A | 3/1976 | Tsubakimoto et al. | 260/39 P |
| 4,095,990 A | 6/1978 | Konigsberg | 106/136 |
| 4,167,422 A * | 9/1979 | Bellanca et al. | 106/402 |
| 4,284,729 A | 8/1981 | Cross et al. | 521/158 |
| 4,846,846 A | 7/1989 | Rekers et al. | 8/515 |
| 4,859,709 A | 8/1989 | Rawlins | 514/770 |
| 5,411,802 A | 5/1995 | Kumar et al. | 428/402 |
| 6,074,629 A | 6/2000 | Kostinko et al. | 424/49 |
| 6,143,280 A | 11/2000 | Pike et al. | 429/49 |
| 6,440,906 B1 | 8/2002 | Moore et al. | 510/117 |
| 6,451,746 B1 | 9/2002 | Moore et al. | 510/117 |
| 6,491,947 B2 | 12/2002 | Moore et al. | 424/466 |
| 7,153,521 B2 | 12/2006 | Viot | 424/442 |
| 2001/0053757 A1 * | 12/2001 | Mendez Mata et al. | 510/499 |

FOREIGN PATENT DOCUMENTS

| | | | |
|---|---|---|---|
| FR | JP 2000-336016 | * | 5/2000 |
| JP | 4330462 | | 11/1992 |
| WO | 00/02984 | | 1/2000 |
| WO | WO 00/02984 | * | 1/2000 |
| WO | 2009/015467 | | 2/2009 |
| WO | WO 2009/042088 | | 4/2009 |

OTHER PUBLICATIONS

AATCC Test Method 182-2005—"Relative Color Strength of Dyes in Soluton". AATCC Technical Manual/2006.
ASTM Designation: D 2414-08—Standard Test Method for Carbon Black—Oil Absorption No. (OAN)[1], Approved Jan. 1, 2008, Published Feb. 2008.
Database WPI Week 199301, Thomson Scientific, London, GB; AN 1993-0035339, XP002603312, Date of Publication Nov. 18, 1992.
Huang Wy et al. "Photoluminescence behavior of poly(quinoline)s in silica glasses via the sol-gel process", Applied Physics Letters vol. 80, No. 7, Feb. 18, 2002.

* cited by examiner

*Primary Examiner* — Bijan Ahvazi
(74) *Attorney, Agent, or Firm* — Brenda D. Wentz

(57) ABSTRACT

This invention relates to solid forms of polymeric colorants and the methods and processes for manufacturing the solid colorants. These solid polymeric colorants may be provided in the form of a free-flowing powder and may be useful for coloring solid pucks, tablets, powder detergents, soaps, fertilizers, personal care products, adhesives, sealants, thermoplastic polymers, thermosetting polymers, and the like.

9 Claims, No Drawings

US 8,535,392 B2

SOLID POLYMERIC COLORANT COMPOSITIONS

FIELD OF THE INVENTION

This invention relates to solid forms of polymeric colorants and the methods and processes for manufacturing the solid colorants. These solid polymeric colorants may be provided in the form of a free-flowing powder and may be useful for coloring solid pucks, tablets, powder detergents, soaps, fertilizers, personal care products, adhesives, sealants, thermoplastic polymers, thermosetting polymers, and the like.

BACKGROUND OF THE INVENTION

Polymeric colorants are widely used in thermoplastics and thermosetting polymers, such as polyurethanes. Polymeric colorants that are non-staining to skin and fabric have found utility in coloring personal and home care products, art products, coatings and inks, and the like. In general, polymeric colorants comprise chromophore moieties and polymeric chains. If the polymeric chains are very long comparing to the chromophores, then the color strength of the polymeric colorants is generally weak. The application for use of these colorants is thus somewhat limited. If the polymeric chains are short, the materials tend to be a paste or viscous liquid. Most of the high color strength polymeric colorants are either sticky liquids or viscous pastes in their undiluted state. These polymeric colorants generally need to be diluted with water or organic solvents to allow convenient handling before being used to color various products. This additional level of solvent may create challenges in the physical properties for certain end-use applications. Furthermore, these liquid formulations of polymeric colorants are often difficult to handle during some manufacturing and application processes, particularly when the final product is a hard solid or powder. Thus, the need exists for a free-flowing solid form of polymeric colorants which allows the polymeric colorant to be utilized in new applications or to be used more easily in existing applications.

There are several ways to make solid polymeric colorants, as disclosed in patents and literature. U.S. Pat. No. 5,411,802 to Kumar et al. discloses a process to make solid color particles by polymerization of formaldehyde, urea, polyamine, and a dye. The colored particles have a size of between 1 and 70 microns and are easily washable when incorporated into a washable formulation.

U.S. Pat. No. 3,945,980 to Tsubakimoto et al. describes finely divided colored or uncolored hardened resin particles made by benzguanamine, melamine, formaldehyde, curing catalyst and others. The colored particles are not soluble in water or other solvents, and they cannot be released to color other articles.

U.S. Pat. No. 4,167,422 to Bellanca et al. discloses organic color pigment lakes comprised of a high molecular weight polymeric dye adsorbed on water insoluble substrates such as alumina. The formed polymeric color lakes are non-bleeding when used in food systems and other industrial applications. When colorants are covalently incorporated into particles, the colorants are no longer water soluble. Thus, there are limitations on the type of chromophore that can be utilized and on how much the colors can be reacted into the particle.

The present disclosure provides methods and processes for converting these liquid and/or paste polymeric colorants into free-flowing powders having relatively high color strength. These free-flowing polymeric colorants are useful for coloring any material that benefits from having a non-permanent, washable colorant contained therein. Exemplary end-use materials include solid pucks, tablets, powder detergents, soaps, liquid detergents, fabric softeners, cleaning compositions, coatings, inks, personal care products, plastics and candles.

DESCRIPTION OF THE INVENTION

All U.S. and foreign patents and U.S. patent applications disclosed in this specification are hereby incorporated by reference in their entirety.

The present invention relates to a solid polymeric colorant composition comprising: (a) from about 10% to about 95% by weight of at least one polymeric colorant having a solids content of at least about 60%, (b) from about 5% to about 90% by weight of at least one solid absorbent material, and (c) from about 0% to about 20% of at least one processing additive; wherein said solid polymeric colorant is a free-flowing powder. The solid polymeric colorant composition may be incorporated for use into a variety of solid and/or liquid articles and formulations.

The term "non-staining" as used herein, generally refers to a colorant composition that may be washed or removed from substrate surfaces (e.g. skin, fabric, wood, concrete) with relatively little effort and without staining the substrate to an appreciable extent.

The term "non-bleeding," as used herein, generally refers to a colorant composition that does not substantially color the material surrounding the colorant composition under conditions wherein the material is not intended to be colored. For example, the colorant composition may be present in a powdered laundry detergent as a colored speckle (i.e. a colored particle that is not chemically a part of the detergent particles during storage). The colorant composition will be considered to be "non-bleeding" if it fails to substantially color the surrounding powdered detergent in its unused state (i.e. while it remains in the package).

The phrase "relatively high color strength," as used herein, generally refers to a colored product having a color value of at least 5.0. Color strength, or color value, is determined using a modified version of AATCC Test Method 182-2000 wherein the color value is determined and calculated on the absorbance of a 1 gram per liter through a one centimeter cell length of the colorant, in the appropriate solvent, by UV-vis spectroscopy.

The term "polymeric colorant" generally refers to a colorant having at least one chromophore portion attached to at least one oligomeric or polymeric chain, wherein the chain has at least three repeating units. The oligomeric or polymeric constituent can be bound to the chromophore via any suitable means, such as a covalent bond, an ionic bond, or suitable electrostatic interaction. Generally, the polymeric colorant may be characterized by having an absorbance in the range of between about 300 nanometers and about 900 nanometers, as measured by UV-vis spectroscopy.

As a function of its manufacturing process, the polymeric colorant has a molecular weight that is typically represented as a molecular weight distribution. Accordingly, the molecular weight of the polymeric colorant is generally reported as an average molecular weight, as determined by its molecular weight distribution.

The chromophore group of the colorant may vary widely, and may include compounds characterized in the art as dyestuffs or as pigments. The actual group used will depend to a large extent upon, for instance, the desired color and colorfastness characteristics. The chromophore group may be attached to at least one polyalkyleneoxy-substituent through a suitable linking moiety of nitrogen, oxygen, sulfur, etc.

Examples of chromophore groups include nitroso, nitro, azo (including monoazo, disazo, trisazo, tetrakisazo, polyazo, formazan, azomethine and metal complexes thereof), stilbene, diarylmethane, triarylmethane, xanthene acridine, quinoline, methine (including polymethine), thiazole, indamine, indophenol, azine, thiazine, oxazine, aminoketone, hydroxyketone, anthraquinone (including anthrapyrazolines, anthrone, anthrapyridone, anthrapyrimidine, flavanthrone, pyranthrone, benzanthrone, perylene, perinone, naphthalimide and other structures formally related to anthraquinone), indigoid (including thioindigoid), and phthalocyanine chromophore groups. Particularly useful in the preparation of the colorants used in the compositions of the invention may be the azo, anthraquinone, triarylmethane and methine dyestuff radicals.

Examples of suitable polymeric chains are polyalkyleneoxy chains. The term "polyalkyleneoxy," as used herein, generally refers to molecular structures containing the following repeating units: —CH$_2$CH$_2$O—, —CH$_2$CH$_2$CH$_2$O—, —CH$_2$CH$_2$CH$_2$CH$_2$O—, —CH$_2$CH(CH$_3$)O—, —CH$_2$CH(CH$_2$CH$_3$)O—CH$_2$CH$_2$CH(CH$_3$)O—, and any combinations thereof.

Typical of such groups which may be attached to the chromophore group are the polymeric epoxides, such as the polyalkylene oxides and copolymers thereof. Typical polyalkylene oxides and copolymers of same which may be employed to provide the colorants include those made from alkylene oxide monomers containing from two to twenty carbon atoms, or more preferably, from two to six carbon atoms. Examples include: polyethylene oxides; polypropylene oxides; polybutylene oxides; oxetanes; tetrahydrafurans; copolymers of polyethylene oxides, polypropylene oxides and polybutylene oxides; and other copolymers including block copolymers, in which a majority of the polymeric substituent is polyethylene oxide, polypropylene oxide and/or polybutylene oxide. Further, such polyalkyleneoxy group may have an average molecular weight in the range of from about 132 to about 10,000, preferably from about 176 to about 5000.

It is to be understood that because the colorants may not ordinarily be chemically bound to the carrier particles, the precise chemical identity of the end group on the polyalkyleneoxy group may not be critical insofar as the proper functioning of the colorant is concerned in the composition. With this consideration in mind certain most preferred colorants will be defined where certain end groups will be identified. Such recitation of end groups is not to be construed as limiting the invention in its broader embodiments in any way. According to such a most preferred embodiment the colorants may be characterized as follows:

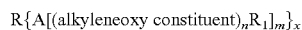

wherein R is an organic chromophore group, A is a linking moiety in said organic chromophore group selected from the group consisting of N, O, S or CO$_2$, the alkylene moiety of the alkyleneoxy constituent contains from 2 to about 4 carbon atoms, n is an integer of from 2 to about 230, m is 1 when A is O, S, CO$_2$ and 1 or 2 when A is N, x is an integer of from 1 to 5, and the product of n times x times m (n.m.x) is from 2 to about 230, and R$_1$ is a member of the group consisting of

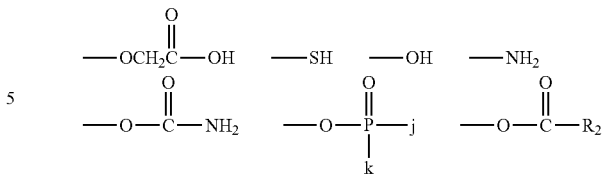

and sulfonates and sulfates of each of the members of said group, wherein R$_2$ is H, an alkyl radical containing up to about 20 carbon atoms or carboxy-terminated alkyl radical containing up to about 20 carbon atoms, j and k are OH, OM or OR$_3$ wherein M is a cation moiety of an alkali metal, an alkaline earth metal, transition metal, e.g., nickel, etc. or ammonium, and R$_3$ is an alkyl radical containing up to about 20 carbon atoms.

The oligomeric constituent can be any suitable constituent including, but not limited to, oligomeric constituents selected from the group consisting of (i) oligomers comprising at least three monomers, or repeating units, selected from the group consisting of C$_2$-C$_{20}$ alkyleneoxy groups, glycidol groups, and glycidyl groups, (ii) aliphatic oligomeric esters conforming to structure (I)

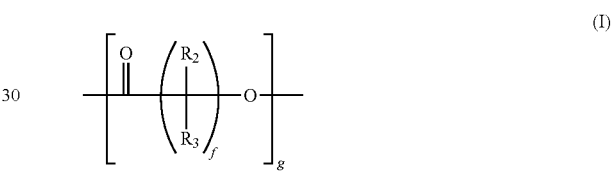

and (iii) combinations of (i) and (ii). In structure (I), R$_2$ and R$_3$ are independently selected from the group consisting of hydrogen and C$_1$-C$_{10}$ alkyl groups, f is an integer between and including 1 and 10, and g is any positive integer or fraction between and including 1 and 20. As will be understood by those of ordinary skill in the art, suitable values for g include both integers and fractions because the length of the oligomeric constituent on the individual polymeric colorant molecules may vary. Thus, the value for g represents an average length of the ester chain for a given sample or collection of polymeric colorant molecules. In certain embodiments, the polymeric colorant can comprise one or more oligomeric constituents consisting of three or more ethylene oxide monomer groups.

The present invention comprises a mixture of a polymeric colorant and a highly absorptive solid carrier, wherein the weight ratio of the polymeric colorant to the solid carrier may be in the range of 0.5 to 5.0, and the resulting colored powders are still free-flowing at ambient conditions. Other components can be added into the polymeric colorant powder as processing additives or to adjust the properties of the final product, such as salts, acids, bases, flowing aids, and the like, and combinations thereof.

In general, the solid polymeric colorant composition of the present disclosure is comprised of (a) from about 10% to about 95% by weight of at least one liquid polymeric colorant, (b) from about 5% to about 90% by weight of at least one solid absorbent compound, and (c) from about 0% to about 20% of at least one processing additive, wherein weight is based on weight of the total weight of the solid polymeric colorant composition. Preferably, the solid polymeric colorants of the present invention are characterized by being composed of a minimum of two parts (a) a polymeric colorant that is soluble in organic or water solvents and (b) a solid component carrier that can may be either soluble or insoluble in organic or water solvents.

Exemplary polymeric colorants include Liquitint® polymeric colorants, Cleartint® polymeric liquid concentrate colorants, Reactint® polymeric colorants, and Palmer® polymeric colorants, all of which are available from Milliken Chemical, a division of Milliken & Company of Spartanburg, S.C. Liquitint® polymeric colorants are characterized in that they are water soluble, non-staining colorants. They are widely used in laundry detergents, fabric softeners, and other consumer and industrial cleaning products. Liquitint® polymeric colorants are generally bright liquid colorants which exhibit excellent solubility in water, are compatible with other chemicals present in their end-use formulations, and are easy to handle. Liquitint® polymeric colorants may be used to provide color in both aqueous and solid systems. The unique polymeric nature of Liquitint® polymeric colorants provides reduced staining to skin, textiles, hard surfaces, equipment, and the like.

Cleartint® polymeric liquid concentrate colorants are specially designed liquid colorants often used for coloring clarified polypropylene articles. These colorants may be incorporated into polypropylene resins easily without detrimentally affecting the clarity of the article to provide transparent, clear and brightly colored polypropylene articles. Cleartint® liquid concentrate polymeric colorants are oligomeric coloring materials which combine the exceptional aesthetics of dyes with the migration resistance of pigments. These colorants may be used as light tints to mask residual haze, or they may be used for deep, rich shades that are not possible with pigment colorants. Cleartint® liquid concentrate polymeric colorants allow clarified polypropylene to rival the beauty of higher cost plastic materials. The technical and physical property benefits of clarified polypropylene may be exploited without sacrificing product aesthetics.

Reactint® polymeric colorants are liquid polymeric colorants useful for coloring polyurethane and other thermoset resins. These colorants are reactive polymeric colorants that consist of chromophores which are chemically bound to polyols. This arrangement allows the polymeric colorant to react into the polyurethane polymer matrix. Unlike pigment pastes, which are dispersions of solid particles in a liquid carrier, Reactint® polymeric colorants are 100% homogeneous liquids that are soluble in polyol and will not settle over time. Because of this pure liquid and easy to disperse nature, it is possible to blend Reactint® colorants in-line and on-the-fly, while producing polyurethane foams and resins.

Palmer® polymer colorants are liquid colorants specially developed for use in washable applications, such as in markers, paints and other art products. They contain no heavy metals, are non-toxic, and have excellent non-staining properties on skin, fabric and other surfaces. Palmer® polymeric colorants have very good compatibility with aqueous ink formulations and provide bright colors.

Preferably, the solid polymeric colorants of the present invention are characterized by being composed of a minimum of two parts (a) a polymeric colorant that is soluble in organic or water solvents and (b) a solid component carrier that can may be either soluble or insoluble in organic or water solvents. The solid polymeric colorants of the present invention are characterized by being apparently readily soluble in water or organic solvents. More specifically, the colorant portions are preferably water soluble at concentrations which provide sufficient coloration for a desired end-use application. The solid polymeric colorants are also characterized by being relatively non-staining to skin, fabric, and many other surfaces and materials. More specifically, the solid polymeric colorants of the present invention are preferably water fugitive (i.e. washable from substrates with water) on all kinds of substrates, such as, for example, human skin, textile substrates, coated surfaces (such as, for example, painted surfaces), ceramic surfaces, etc.

Additionally, while the solid polymeric colorants of the present invention are apparently soluble in water or organic solvents, they generally contain no solvent, or very little solvent, which is beneficial in certain end-use applications. The solid polymeric colorants may include reactive groups so that they may be reacted further into polymer matrixes. The solid polymeric colorants are easy to handle, and in most instances, are easier to handle than viscous liquids or pastes for many end-use applications. It is surprising that the liquid or paste polymeric colorants can be converted into free-flowing powders that typically still keep more than half of their original color strength, and in some instances, keep more than 90% of their original color strength. The resulting free-flowing polymeric colorant powders can be easily transferred, measured and dispersed in intended end-use applications.

The term "free-flowing powder" is intended to refer to a solid polymeric colorant comprising particles which are characterized in that the particles do not adhere to one another. The size of the particle may be expressed in terms of the particle's diameter. The diameter of the particle may be determined by sieving techniques and may be independent of the shape of the particle. Preferably, the particles are characterized by having a diameter of from 0.1 micrometers to 10,000 micrometers, more preferably from 1 micrometer to 1,000 micrometers, and even more preferably from 5 micrometers to 500 micrometers.

The particles of the free-flowing powder may be further treated by processes which may result in the particles having a more uniform size and/or size distribution. Examples of such processes include milling, micropelletizing, and the like.

There are a variety of solid carriers or fillers that may be used to make the free-flowing polymeric colorant powders according to the present invention. The term "carrier" generally refers to materials with high absorption capacity, whereas the term "filler" generally refers to materials having low or medium absorption capacity. The solid carriers may be water insoluble or water soluble materials. The carriers are generally highly absorptive, which typically indicates they may absorb at least 50% of their own weight of water or oil. The carriers usually have a bulk density property of less than the density of the liquid, like water or oil. The absorption power of a carrier may be measured using a DBP (dibutylphthalate) absorption value, wherein the amount of dibutylphthalate that can be absorbed by the carrier, while the final material remains a dry, free-flowing powder, is measured. One such method is described in ASTM D2414-65. For this invention, the oil absorption of the carriers will be higher than 150 milliliters/100 grams. Some of the carriers may have oil absorption value higher than 1000 milliliters/100 grams.

Preferred solid carriers are porous, particulate solid materials which can remain dry and free-flowing after absorbing a liquid or paste polymeric colorant. Non-limiting examples of the solid absorbent compound include silica, clay, zeolite, and combinations thereof, as well as organic materials such as urea formaldehyde polymer. Combinations of organic and inorganic solid absorbent compounds may also be utilized.

Specific examples of such solid carriers include, but are not limited to, metal oxides such as silica and alumina; metal salts of alumino-silicates such as zeolites; clays; diatomites; hydrotalcites; cross-linked porous synthetic polymeric materials such as styrene-divinylbenzene polymers; cross-linked modified starches; cross-linked acrylate polymers; metal organic framework (MOF) materials; hollow glass spheres; organic-inorganic mesoporous hybrid materials; and mixtures thereof. Of the above listed solid carriers, diatomites and porous silica may be most preferred due to their economical availability and their highly absorptive properties. These preferred materials also disperse into water and organic solvents.

Diatomite (also known as diatomaceous earth or DE or celite) is a naturally occurring, soft, chalk-like sedimentary rock that is easily crumbled into a fine white to off-white powder. The typical chemical composition of diatomaceous earth is 86% silica, 5% sodium, 3% magnesium and 2% iron. Examples of commercially available diatomite include Celite® 507, Celite® 110 and Celite® 500 (from World Minerals Company) and Solid-A-Sorb® (from EaglePicher Company).

The silica-based carriers for this invention may be synthetic amorphous silica or naturally occurring silica or silicate containing compounds, or combinations thereof. Precipitated silicas are synthesized by acidifying sodium silicate with sulfuric acid and filtering and drying processes. The dried silica may be subjected to milling and classifying steps to obtain a specific particle size distribution. The precipitated silicas distinguish themselves from silica gels on the basis of pore structure. Precipitates typically have a broad meso/macroporous pore structure reflected in the pore size distribution, whereas gels generally have a more narrow microporous or mesoporous structure. Precipitated silica consists of a three-dimensional network of coagulated primary silica particles. The latter grow to sizes greater than 4-5 nm before they coagulate to form the aggregated clusters.

Examples of commercially available precipitated silica products include Hi-Sil® ABS, Hi-Sil® 210, Hi-Sil® SC-72 and Hi-Sil 233 (all from PPG Industries); Sipernat® 22, Sipernat® 50 and Sipernat® 2200 (all from Evonik Industries); and Tixosil® 38A, Tixosil® 38D Tixosil® 68 and Tixosil® 38X (all from Rhodia). Other type of silica may also be used. For example, fumed silica, surface treated silica, and silica gels may be useful. Commercially available examples of these silicas materials include Aerosil® products (from Evonik Industries) and CAB-O-SIL® fumed silica and Nanogel® amorphous silica gels (from Cabot). In general, the precipitated silica can absorb DBP in amounts up to about 400% by weight of their own weight.

Other synthetic inorganic materials may also be employed for use as solid carriers in the present invention. One such example is Micro-Cel® E (from World Minerals Company), a synthetic hydrated calcium silicate with a porous structure. Micro-Cel® E is capable of absorbing high amounts of organic liquids and/or water. Other synthetic solid carriers include Neusilin® amorphous magnesium aluminometasilicate and Fujicalin® dibasic calcium phosphate from Fuji Chemical Industry Co. and Magnesol® and Dalsorb® magnesium silicate from The Dallas Group of America, Inc.

Additional synthetic solid carriers also include inorganic salts, such as calcium carbonate, calcium magnesium carbonate, soldium sulfate, calcium sulfate, phosphates. Other inorganic absorption materials include volcanic ash, vermiculite, sepiolite and the like.

Other solid carriers include expanded anhydrous sodium perborate compounds. These compounds are known for use in incorporating liquid actives into tablets with minimal effect on tablet properties. For instance, they may be used to carry solvents in effervescing formulations. See, for example, U.S. Pat. Nos. 6,451,746; 6,491,947 and 6,440,906.

Natural occurring clays can also be used in this invention as carriers, especially some of them having high absorption capacities. Examples of absorptive clays include attapulgite, bentonite and montmorillonite. Attapulgite has ribbons of alumino-silicate layers to be joined at their edges and needle shapes. This structure produces a magnesium aluminum silicate clay of very fine particle size, or a micro-sponge that is naturally designed to absorb liquids. Attapulgites disperse well and exhibit excellent thickening, suspending and gelling properties without flocculation problems. Bentonite is known as "swelling" or "plastic" clay that effectively absorbs and retains relatively high amounts of water. Montmorillonite is a layered silicate belonging to the smectite group of phyllosilicate minerals. Montmorillonite occurs naturally as a sequence of stacked layers 1.0 to 1.5 nanometers thick. These layers are the fundamental building blocks of montmorillonite and are strongly two-dimensional. These layers are frequently described as "stacks of cards" or "layers of cards" to better describe their unique structure and form. As a result of its unique structure, montmorillonite possesses the ability to absorb large amounts of water and other liquids. The liquid is absorbed onto, or hydrates, the layers at the interlayer cation site, causing swelling. The result is a mineral that can absorb in 2-10 times its weight of liquid.

Both natural and synthetic zeolites can be used in this invention as carriers due to their good adsorption properties. Zeolite is a crystalline hydrated aluminosilicate whose framework structure encloses cavities (or pores) occupied by cations and water molecules, both of which have considerable freedom of movement, permitting ion exchange and reversible dehydration. This definition places it in the class of materials known as "molecular sieves." The pores in dehydrated zeolite are generally about 6 Angstroms in size, while those of a typical silica gel average about 50 Å. More than 150 zeolite types have been synthesized and 40 naturally occurring zeolites are known. Zeolites occur as hydrates, and all members of the family contain at least one silicon atom per aluminum atom.

Some organic polymers can also be useful in the present invention as carriers. Examples of such polymers include copolymer of styrene and divinylbenzene, cellulose, urea-formaldehyde polymers, epoxy copolymers, and the like, and mixtures thereof.

Some botanical materials or products based on these botanical materials are also can be used as carriers, especially when they have really good absorption capacities. Examples of these type of materials are corn cob, citrus pulp, rice hull, walnut shell, extracted lint from cotton seed and the like.

The weight ratio of polymeric colorant to solid carrier may be changed depending on the properties of the specific polymeric colorant and solid carrier employed. In general, in order to obtain high color strength and free-flowing polymeric colorant powders, the ratio of polymeric colorant to solid carrier should be at least 0.5, preferably, at least 1.5, more preferably at least 2.0, and most preferably at least 3.0.

Processing additives may be added to the mixture forming the solid polymeric colorants. The processing additives may be inorganic materials, organic materials, and mixtures thereof. For example, soldium sulfate may be added to adjust the final color strength of the colored solid. Flowing aids, such as silica, may be added to improve the flowing property of the colored solid. Citric acid may be added to adjust the pH of the water solution of the colored powder. Other processing additives may be added to the mixture such as anti-caking agents, stabilizing agents, and the like. Any mixture of the foregoing additives may be utilized. In general, the amount of processing additives is in the range of 0% to 20% by weight of the solid polymeric colorant, more preferably, in the range of 0.0001% to 10% by weight of the solid polymeric colorant.

One or more optional ingredients may be added to the solid polymeric colorant composition. For example, a compound which provides a desirable odor to the solid colorant composition, such as a fragrance or perfume, may be included in the composition. A fragrance, or perfume, may be any compound known to impart a desirable odor to a composition. The fragrance may be comprised of naturally occurring compounds, or it may be comprised of synthetically made compounds. Fragrances may include, merely as an example, oils, such as citric oils.

Other ingredients may be added to the solid polymeric colorant composition, depending on the specific end-use of the composition. These additives may include, for example, defoamers or antifoaming agents, surfactants, pesticides, antifungal agents, antimicrobial agents, effervescents, slow release agents, coating agents, soil release agents, fillers (e.g. sorbitol), and the like, and mixtures thereof. These other additives may be present in an amount between 0.001% and 25% by weight of the solid polymeric colorant composition, preferably between 0.01% and 15% by weight, and more preferably between 0.1% and 5% by weight of the composition.

One method for producing the solid polymeric colorants of the present invention includes mixing an undiluted polymeric colorant liquid with an absorbent carrier compound, and optionally processing additives, in a mixer at room temperature until a relatively uniform, free-flowing solid powder colorant is formed. Another method for producing the solid polymeric colorants of the present disclosure includes the use of a liquid dispersant, such as water or organic solvents, as an aqueous media to disperse all components, when the polymeric colorants are a paste or are otherwise too viscous to be handled easily. Another way to make the solid polymeric colorants of the present invention involves a process of spraying a liquid polymeric colorant onto a solid carrier to form a substantially uniformly colored mixture. This process may involve continuously stirring the mixture while the liquid colorant is being sprayed onto the carrier.

Any remaining liquid that exists in the prepared mixtures may be removed by heating or vacuum evaporation, until the final mixture is a solid polymeric colorant, such as a free-flowing polymeric colorant powder. An additional step of milling or blending the resulting solid colorant may be carried out to ensure greater uniformity of the solid colorant and/or to maximize the free-flowing properties of the solid polymeric colorant.

The solid polymeric colorants of the present invention generally possess many desirable and advantageous properties for use in coloring various consumer products such as powder detergents, heavy-duty liquid detergents, hard surface cleaners, and the like. Additionally, these solid polymeric colorants may exhibit desirable color brightness. As such, these solid polymeric colorants may be used to color various personal care, home care, and fabric care products. For example, the colorants may be used to color soap bars, liquid soaps, fabric softeners, car washing formulations, glass cleaners, toilet cleaners (such as toilet pucks), shampoos, and the like. Thus, the solid polymeric colorant may be incorporated into a solid article, wherein the solid article is selected from the group consisting of tablets, powders, granules, and mixtures thereof. Alternatively, the solid polymeric colorant may be incorporated into a liquid formulation.

The solid polymeric colorants can also be used in industrial formulations, such as in heavy-duty industrial cleaners and detergents and fertilizers. Additionally, it is contemplated that the colorants of the current invention may be ideal for use in coloring thermoplastic materials (such as, for example, polyolefin and polyester) and thermoset materials (such as, for example, polyurethane foam).

Examples of specific thermoset formulations, which may be suitable for use with the solid polymeric colorant of the present invention, are disclosed in commonly assigned U.S. Pat. Nos. 4,284,729 to Cross et al. and 4,846,846 to Rekers et al. In general, polyurethane foam is produced through the catalyzed polymerization of the reaction products of polyols and isocyanates. Blowing agents present within the polymerization step typically provide the necessary foam-making capability. Such a reaction is well known throughout the polyurethane industry and has been practiced for many years.

It is also contemplated to be within the scope of this invention that a large variety of colors and shades may be obtained by blending the solid polymeric colorants with each other or with other types of water soluble colorants. Blending of the colorants may be readily accomplished, for example, when combining colorants having substantially identical solubility characteristics. One exemplary class of colorants includes the Reactint® colorants, which are generally water soluble, or dispersible, at room temperature and may be suitably blended with the solid polymeric colorant of the present invention to achieve improved colors and shades.

Accordingly, the solid polymeric colorants of the present disclosure may be incorporated into any material that needs to be colored with a washable colorant. These materials include, without limitation, (a) various personal care, home care, and fabric care products (such as, for example, liquid and solid laundry detergents and liquid fabric softeners, candles, inks and the like), (b) thermoplastic materials and thermoset materials (such as polyurethane foam articles), and (c) industrial products, including agriculture and landscaping materials (such as herbicides, pesticides, fertilizers and the like).

EXAMPLES

The following examples are provided for illustration purposes and should not be considered as limiting the scope of the invention.

All color values and absorbance values were measured using a Beckman DU 650 spectrophotometer. The higher the color value measured, the stronger the colorant. All values and percentages are provided based on 100 percent solids, unless otherwise indicated.

Various Liquitint® and Reactint® liquid polymeric colorants and Cleartint® liquid concentrate polymeric colorants, available from Milliken & Company of Spartanburg, S.C., were employed as raw materials in the production process of the free-flowing solid polymeric colorant powders described herein.

Example 1

Liquitint® Blue WU Powder with Precipitated Silica 100 g of Liquitint® Blue WU (available from Milliken & Company, Spartanburg, S.C.) was dried with rotovapor to remove water until the solids content was greater than 98%. The dried Liquitint® Blue WU, having a color value of 110, was mixed with 30 g Hi-Sil® ABS precipitated silica (PPG Industries, Pittsburg Pa.) in a Kitchen-Aid® mixer for about 5 minutes. The resulting solid polymeric colorant composition was a dark blue free-flowing powder (65 g) which exhibited a color value of 86.4 with a maximum absorbance in methanol at 628 nm.

Example 2

Liquitint® Blue WU Powder with UF Polymer 10 g of the dried Liquitint® Blue WU from Example 1 was mixed with 10 g of dry urea formaldehyde polymer powder (available from Milliken & Company, Spartanburg, S.C.) and 1 g of silica gel (available from Aldrich) in a mixer. The resulting solid polymeric colorant composition was a dark blue free-flowing powder which exhibited a color value of 45.5 with a maximum absorbance in methanol at 628 nm.

Example 3-10

Table of Liquitint® Colorant Powders

Other free-flowing, solid polymeric colorant powders were made following the same procedure and using the same solid carrier material from Example 1. The results are provided in Table 1.

TABLE 1

Color Strength of Free-Flowing Solid Polymeric Colorants

| Liquitint® Polymeric Colorant | Colorant/ Carrier Weight Ratio | Color Value | Maximum Absorbance in Methanol (nm) |
|---|---|---|---|
| Royal Blue | 3.3:1 | 36.3 | 623 |
| Blue 38 | 2.7:1 | 34.3 | 623 |
| Blue HP | 2.6:1 | 14.8 | 638 |
| Violet LS | 2.5:1 | 32.9 | 589 |
| Green RC | 2.5:1 | 20.0 | 627 |
| Brilliant Orange | 2.5:1 | 16.1 | 445 |
| Red ST | 2.5:1 | 13.7 | 521 |
| Yellow LP | 2.5:1 | 18.7 | 422 |

Example 11

Reactint® Violet X80 Powder 5 g of Reactint® Violet X80 and 5 g of Hi-Sil® precipitated silica (PPG) were mixed well in a beaker. The resulting solid polymeric colorant composition was a dark blue free-flowing powder which exhibited a color value of 10.7 in methanol with a maximum absorbance at 570 nm.

Example 12

ClearShield® 390B Powder 10 g of ClearShield® 390B and 10 g of silica powder (Aldrich) were combined together in a mixer. The resulting solid polymeric colorant composition was a yellow free-flowing powder which exhibited a color value of 17.5 in methanol with a maximum absorbance at 360 nm.

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

We claim:

1. A solid polymeric colorant composition comprising:
   a) from about 10% to about 95% by weight of at least one water soluble polymeric colorant having the following formula:

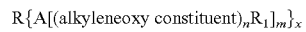

wherein R is an organic chromophore group; A is a linking moiety in said organic chromophore group selected from the group consisting of N, O, S or $CO_2$; the alkylene moiety of the alkyleneoxy constituent contains from 2 to about 4 carbon atoms; n is an integer of from 2 to about 230; m is 1 when A is O, S, $CO_2$ and 1 or 2 when A is N; x is an integer of from 1 to 5; and the product of n times x times m (n·m·x) is from 2 to about 230; and $R_1$ is a member of the group consisting of

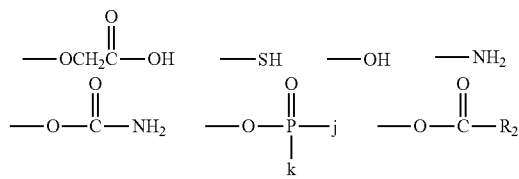

and sulfonates and sulfates of each of the members of said group, wherein $R_2$ is H, an alkyl radical containing up to about 20 atoms or carboxy-terminated alkyl radical containing up to about 20 carbon atoms, j and k are OH, OM or $OR_3$ wherein M is a cation moiety of an alkali metal, an alkaline earth metal, a transition metal, or ammonium, and $R_3$ is an alkyl radical containing up to about 20 carbon atoms; and
   wherein said water soluble polymeric colorant has a solids content of at least about 60%; and
   b) from about 5% to about 90% by weight of at least one solid absorbent material; and
   c) from about 0% to about 20% of at least one processing additive;
   wherein said solid polymeric colorant is a free-flowing powder.

2. The solid polymeric colorant composition of claim 1, wherein the at least one solid absorbent material is selected from the group consisting of silica, clay, zeolite, urea formaldehyde polymers, and mixtures thereof.

3. The solid polymeric colorant composition of claim 1, wherein the at least one solid absorbent material is selected from the group consisting of metal oxides, metal salts of alumino-silicate, expanded anhydrous sodium perborates, clays, diatomites, hydrotalcite, cross-linked porous synthetic polymeric materials, cross-linked modified starches, cross-linked acrylate polymers, metal organic framework (MOF) materials, hollow glass spheres, organic-inorganic mesoporous hybrid materials, and mixtures thereof.

4. The solid polymeric colorant composition of claim 1, wherein the at least one processing additive is selected from the group consisting of fillers, anti-caking agents, flow enhancing agents, stabilizing agents, and mixtures thereof.

5. The solid polymeric colorant composition of claim 1, wherein the composition further includes one or more additives selected from the group consisting of antifoaming agents, surfactants, pesticides, coloring agents, antifungal agents, antimicrobial agents, effervescents, slow release agents, coating agents, fragrances, perfumes, and soil release agents.

6. The solid polymeric colorant composition of claim 1. wherein the composition is blended with at least one additional water soluble colorant.

7. A solid article comprising the solid polymeric colorant of claim 1.

8. The solid article of claim 7, wherein the solid article is selected from the group consisting of tablets, powders, granules, and mixtures thereof.

9. A liquid formulation comprising the solid polymeric colorant of claim 1.

* * * * *

UNITED STATES PATENT AND TRADEMARK OFFICE
CERTIFICATE OF CORRECTION

PATENT NO. : 8,535,392 B2
APPLICATION NO. : 12/277595
DATED : September 17, 2013
INVENTOR(S) : Xiaoyong M. Hong and Dominick J. Valenti It is certified that error appears in the above-identified patent and that said Letters Patent is hereby corrected as shown below:

In the Claims:

In Column 12, line 29, after "20" and before "atoms", add --carbon--.

Signed and Sealed this
Fifth Day of November, 2013

Teresa Stanek Rea
*Deputy Director of the United States Patent and Trademark Office*